Figure 1:
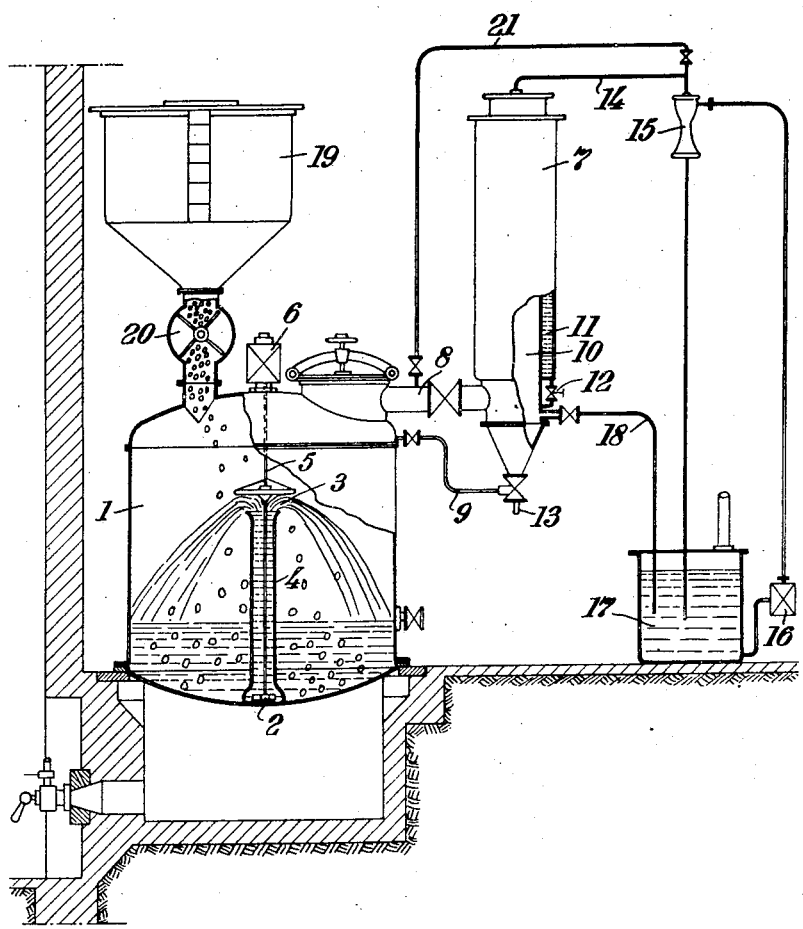

Feb. 7, 1939.                R. WIRTH                2,146,164
APPARATUS FOR TREATING LINSEED-DRYING OIL, RESINS, AND COPALS
                Filed Nov. 20, 1936         2 Sheets-Sheet 1

Inventor:
Robert Wirth
his Attorney

Patented Feb. 7, 1939

2,146,164

UNITED STATES PATENT OFFICE 2,146,164

APPARATUS FOR TREATING LINSEED-DRY-ING OIL, RESINS, AND COPALS

Robert Wirth, Beckum, Germany, assignor of one-third to Ernst Willmeroth and one-third to Hans Behrisch, both of Hamburg, Germany Application November 20, 1936, Serial No. 111,952
In Germany November 12, 1935

1 Claim. (Cl. 87—2)

This invention relates to apparatus for treating linseed drying oils, resins and copals in employing a boiler provided with a circulating device.

For rendering odorless fats and oils in a vacuum device it has been proposed to introduce into the boiler by means of an injector superheated steam which sucks up the oil, mixes intimately with the oil and descends as spray on to the surface of the oil charge.

This process is not suitable for boiling the linseed oil to form so-called "drying oil", as 10 to 20 or even more hours are required for the polymerization of linseed oil. Very large quantities of steam would therefore be necessary for carrying out the thickening process of the linseed oil by means of superheated steam. Moreover, the contents of the boiler are not agitated by the steam-oil mixture descending on the surface owing to the light and nebulous state of the mixture.

It is known in connection with steam-heated brewing and mash coppers to arrange a ring-shaped riser pipe around the heating coil in order to obtain an intensive heat-equalization.

The process according to the invention consists in raising the material, for example by a feed turbine, from the bottom of the vessel in employing a boiler provided with a circulating device, and in causing the material to descend in jets on to the surface of the material. In this manner an intensive, uniform heating is attained by circulation and agitation and likewise a better evaporation of the by-products.

When treating copal, a fraction of the total quantity of copal to be treated is subjected to the melting down process in combination with the above mentioned treatment process, whereupon thereto additional fractions of the total quantity are fed to the already heated and liquid copal in predetermined intervals for participating in the melting down process. This intermittent melting down of copal has already been proposed without, however, provision having been made for a circulation of the melted material by raising the liquid material and allowing it to descend. This circulation, however, presents the particular advantage in the melting down of copals, that liquid material immediately flows through the intermittently charged material and thus brings it to the necessary temperature more rapidly. Furthermore for treating copal in this manner no special measures are required for preventing the material from frothing or for splitting up the froth which is formed, as is the case for example in large copal boilers which treat quantities of more than 300 kilograms in a single charge. In the process according to the invention only small charges of raw copal are present in the boiler, and the successively introduced single lumps of copal are heated and melted uniformly by being flushed with liquid copal mass. A caking of large tough copal masses cannot occur. The melting out or melting down process takes place gradually and quickly and yields a uniform, light colored product. Moreover, no special bottom stirring mechanism is required, as the molten material is in continual circulation.

The material can be melted in a relatively large boiler in successive charges of about 200 to 300 kilograms per charge, and the molten material continually delivered into a second boiler by means of a feed turbine. In this case it is advisable to arrange the second boiler in the first boiler. This type of process presents the advantage that, with a larger boiler bottom surface a relatively small quantity of copal is subjected to the melting process and distributed over the large, heated bottom surface of the boiler, in a layer of only relatively shallow depth so that it very quickly melts down, without it being possible for lumps of copal to cake or sinter together. By the continual conducting off of the molten quantity of copal there is ensured that the raw copal always lies distributed over the hottest portion of the boiler. Furthermore the discharging of the molten material ensures a flow of the copal over the bottom of the boiler thereby effecting an improvement of the heat transmission. One of the effects of the arrangement of the second boiler within the melting boiler is, that the melted out copal is kept hot by the outer boiler.

It is advisable to conduct the molten material from the main boiler into the inner auxiliary boiler at the top end of the latter in the form of jets. By this means the expulsion of the volatile components is very considerably facilitated and a certain movement is imparted to the material in the inner boiler.

To esterify the whole quantity, when employing two boilers, the main and auxiliary boilers communicate by a second point of connection, so that the molten material is kept in continuous circulation by a feed pump until the esterification is completed.

The process and manner of carrying out this process is hereinafter described in detail with reference to the accompanying drawings, in which Fig. 1 is a diagrammatic view showing an apparatus for carrying out the process, without auxiliary boiler.

Figure 2:
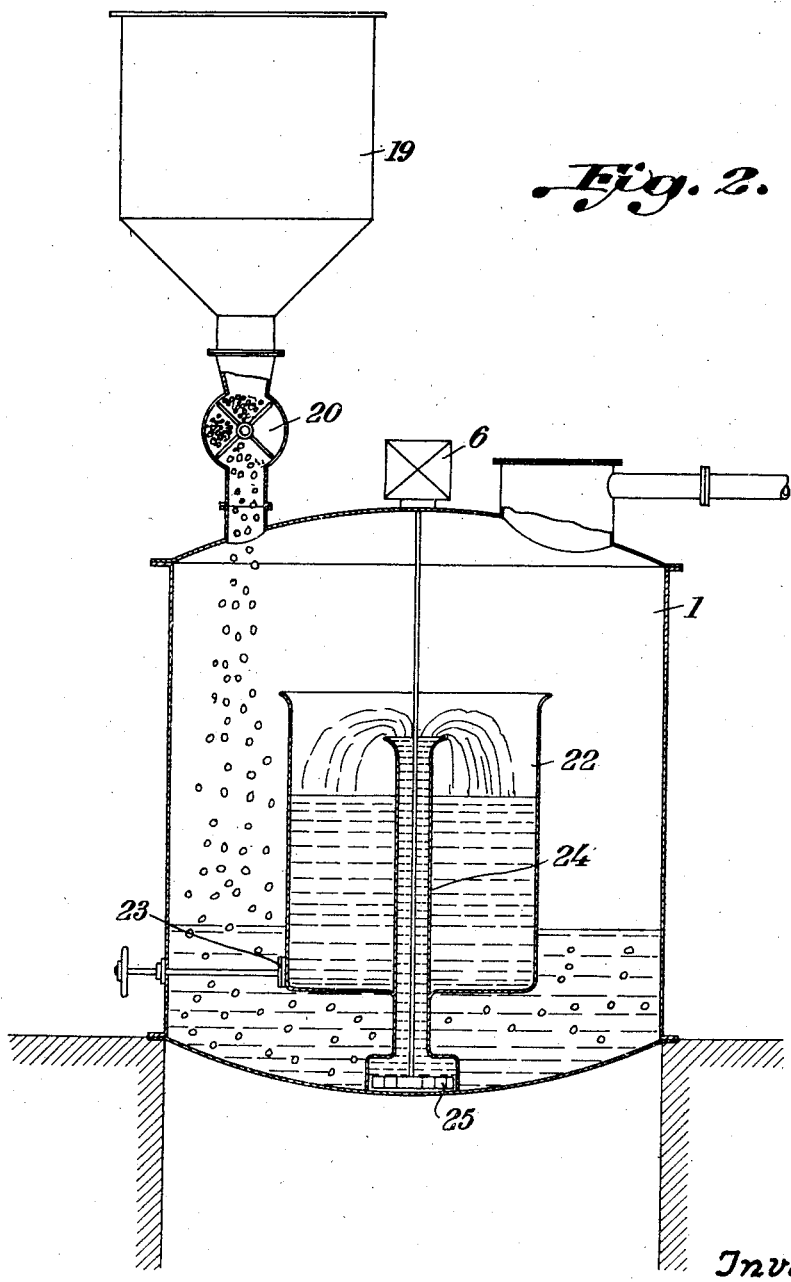

Fig. 2 shows the essential greater portion of an apparatus with internal auxiliary boiler.

A circulating device is arranged in a boiler 1. This device comprises a feed turbine 2 situated near the bottom of the boiler 1, a spray or jet producer 3 and a riser pipe 4. The feed turbine is driven by a motor 6 through the intermediary of a shaft 5.

In the example illustrated in Fig. 1 an auxiliary vessel is connected with the boiler 1 and arranged on a higher level than the boiler 1, that is a portion of the auxiliary vessel is higher than the boiler. The auxiliary vessel 7 is connected with the boiler 1 by an upper pipeline 8 and by a lower pipeline 9. The auxiliary vessel is composed of two concentric chambers 10 and 11 arranged one within the other, the outer annular chamber 11 being connected with the inner chamber by a pipe with shut off cock 12. A pipe 13 leads from the lower part of the inner chamber. A liquid spray-pump 15 fed by a pump 16 is connected with the upper end of the auxiliary vessel by a pipe 14 and feeds the waste steam into a steam trap 17.

By making the auxiliary vessel of two concentric cylinders it serves as cooler, glycerine storage tank and glycerine separating vessel, as the outer annular chamber can be fitted with a cooling medium, while the lower portion of the inner chamber connected with the boiler by the pipeline 9 serves as a glycerine storage tank and the upper portion of the inner chamber acts as glycerine separating vessel.

The storage tank 19 equipped with a distributor 20 is likewise connected with the boiler 1. The distributor operates periodically being driven, for example, by the motor 6 of the feed turbine through the intermediary of a reduction gear having a sufficiently larger ratio of transmission, that is, it allows raw copal to drop into the boiler at intervals. It is absolutely hermetically shut off from the boiler. A pipeline 21 leads from the pipeline 8 directly to the liquid spray pump 15 and can be employed during the treatment of copal.

When treating copals, 200 kilograms of copal are first charged, for example into the boiler 1 and subjected to heat treatment. On this quantity becoming liquid another quantity of copal is fed thereto by the distribution. When this additional quantity has liquified yet another quantity is fed by the distributor and so forth until the whole quantity to be treated has been charged into the boiler 1. The vapors generated escape through the pipeline 21. After the melting out or down process the copal can be esterified in known manner and converted into varnish.

The treatment can also be carried out in such a manner that (as above described) the quantity of copal first charged into the boiler is thoroughly melted out, whereupon, each time other fractions are charged, a portion of the copal melted down in the boiler 1 is fed into another boiler. In this instance the melting boiler proper can be much smaller than in the instance first described.

According to Fig. 2 the apparatus comprises an outer boiler 1 in which a smaller boiler 22 is arranged clear of the bottom of the boiler 1. The two boilers communicate by an aperture which can be closed by a valve 23. A riser pipe 24 extends through the bottom of the boiler 22, the lower end of this pipe being slightly above the bottom of the boiler 1 and its upper end near the top of the boiler 22. A feed turbine 25 is arranged in the lower end of the riser pipe 24 and driven by the motor 6. A silo 19 is connected to the main boiler 1 and periodically allows raw copal to roll into the boiler 1 through the distributor 20. The silo and distributor can evidently be arranged so that the material drops into the boiler 1 all round the boiler 22.

The apparatus operates in the following manner:—

First 200 to 300 kilograms of copal are charged into the boiler 1 and subjected to heat treatment. As soon as this charge is liquid small quantities of raw copal are added by the distributor and liquid copal is continuously conveyed from the outer boiler into the inner boiler until the desired total quantity of copal has been treated. The liquid copal delivered into this inner boiler 22 is kept hot by the heated copal in the outer boiler 1. If the copal is to be esterified with glycerine at the end of the melting down process, the valve 23 is opened so that the outer and inner boilers communicate. The copal, assisted by the pump 25, then continually circulates between the inner and outer boilers until the esterification is terminated.

It is evident that the apparatus illustrated in Fig. 1 can be operated in the same or in a similar manner.

I claim:—

An apparatus for treating linseed-drying oil, resins and copals, comprising in combination a main boiler, an auxiliary boiler arranged in said main boiler slightly above the bottom thereof, a shut off element between said main boiler and said auxiliary boiler, a riser pipe extending through the bottom of said auxiliary boiler and terminating at its upper end near the top of said auxiliary boiler, the lower end of said riser pipe being situated slightly above the bottom of said main boiler, and a feed turbine in the lower end of said riser pipe adapted to feed the molten material from said main boiler into said auxiliary boiler through said riser pipe.

ROBERT WIRTH.